United States Patent
Liu et al.

(10) Patent No.: US 11,647,009 B2
(45) Date of Patent: May 9, 2023

(54) ACCESS REQUEST CONVERSION METHOD AND APPARATUS

(71) Applicant: ALIBABA GROUP HOLDING LIMITED, Grand Cayman (KY)

(72) Inventors: Xin Liu, Hangzhou (CN); Zhaowei He, Hangzhou (CN); Tingliang Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/003,046

(22) Filed: Jun. 7, 2018

(65) Prior Publication Data

US 2018/0288187 A1 Oct. 4, 2018

Related U.S. Application Data

(63) Continuation of application No. PCT/CN2016/107408, filed on Nov. 28, 2016.

(30) Foreign Application Priority Data

Dec. 8, 2015 (CN) .......................... 201510896122.8

(51) Int. Cl.
*H04L 9/40* (2022.01)
*H04L 41/5025* (2022.01)
(Continued)

(52) U.S. Cl.
CPC .......... *H04L 63/08* (2013.01); *H04L 41/5025* (2013.01); *H04L 63/0853* (2013.01);
(Continued)

(58) Field of Classification Search
CPC ..... H04L 63/08; H04L 41/5025; H04L 67/02; H04L 67/2823; H04L 63/0853;
(Continued)

(56) References Cited

U.S. PATENT DOCUMENTS 6,792,605 B1 9/2004 Roberts et al.
7,873,734 B1* 1/2011 Eidelman ............. H04L 67/142
709/203
(Continued)

FOREIGN PATENT DOCUMENTS

CN 1202291 A 12/1998
CN 1864160 A 11/2006
(Continued)

OTHER PUBLICATIONS

Eddelbuettel et al., "RProtoBuf: Efficient Cross-Language Data Serialization in R," Cornell University Library, pp. 1-29 (2014).
(Continued)

*Primary Examiner* — Henry Tsang
(74) *Attorney, Agent, or Firm* — Finnegan, Henderson, Farabow, Garrett & Dunner, LLP (57) ABSTRACT

Embodiments of the present invention provide an index establishment method and device. The method can include receiving an access request sent by the client, the access request including a uniform resource locator (URL) and parameter information; determining a target service type of the access request according to the URL and the parameter information; converting the access request according to the target service type; and sending the converted access request to a server corresponding to the target service type.

13 Claims, 5 Drawing Sheets

(51) Int. Cl.
*H04L 67/02* (2022.01)
*H04L 67/01* (2022.01)
*H04L 67/60* (2022.01)
*H04L 67/565* (2022.01)
*H04L 67/146* (2022.01)

(52) U.S. Cl.
CPC .......... *H04L 63/0876* (2013.01); *H04L 67/01* (2022.05); *H04L 67/02* (2013.01); *H04L 67/146* (2013.01); *H04L 67/565* (2022.05); *H04L 67/60* (2022.05)

(58) Field of Classification Search
CPC ... H04L 63/0876; H04L 67/146; H04L 67/32; H04L 67/42; H04L 41/0226
See application file for complete search history.

(56) References Cited

U.S. PATENT DOCUMENTS

| | | | | |
|---|---|---|---|---|
| 2008/0147842 | A1* | 6/2008 | Mohri | H04L 12/281 709/223 |
| 2009/0327868 | A1* | 12/2009 | Tsukikawa | G06F 9/541 715/239 |
| 2009/0328174 | A1* | 12/2009 | Cen | H04L 63/0884 726/7 |
| 2010/0312863 | A1* | 12/2010 | Mohr | H04L 41/0813 709/220 |
| 2011/0178831 | A1* | 7/2011 | Ravichandran | G06Q 10/06 705/7.11 |
| 2014/0082170 | A1 | 3/2014 | Kaemmerer et al. | |
| 2016/0078006 | A1* | 3/2016 | Straub | H04L 67/02 715/235 |
| 2016/0088023 | A1* | 3/2016 | Handa | G06F 16/957 726/1 |

FOREIGN PATENT DOCUMENTS

| | | | |
|---|---|---|---|
| CN | 1867906 | A | 11/2006 |
| CN | 101674236 | A | 3/2010 |
| CN | 101924758 | A | 12/2010 |
| CN | 102056333 | A | 5/2011 |
| CN | 102262560 | A | 11/2011 |
| CN | 102547553 | A | 7/2012 |
| CN | 102694701 | A | 9/2012 |
| CN | 103001931 | A | 3/2013 |
| CN | 103383687 | A | 11/2013 |
| CN | 103716308 | A | 4/2014 |
| JP | 2003-531412 | A | 10/2003 |
| JP | 2009301480 | A | 12/2009 |
| WO | WO 03/073700 | A2 | 9/2003 |
| WO | WO 2017/097123 | A1 | 6/2017 |

OTHER PUBLICATIONS

Extended European Search Report pursuant to Rule 62 EPC, the Supplementary European Search Report (Art. 153(7) EPC) and the European Search Opinion issued in EPO Application No. 16872315.3-1216 dated Aug. 22, 2018 (10 pages).

Jiang et al., "A Predictive Dynamic Load Balancing Algorithm with Service Differentiation," 15$^{th}$ IEEE International Conference on Communication Technology, pp. 372-377 (2013).

PCT International Search Report and Written Opinion issued in International Application No. PCT/CN2016/107408, dated Feb. 20, 2017 (13 pages).

Smart Network Tech. Team, "Proposal for TS Document: Protocol Specification for Content Delivery Over NGSON," Network R&D Lab., KT, pp. 1-6 (2011).

First Office Action issued by The State Intellectual Property Office of People's Republic of China in corresponding Chinese Application No. 201510896122.8; dated Jun. 25, 2019 (18 pgs.).

Supplemental Chinese Search Report issued in corresponding Chinese Application No. 201510896122.8 dated May 22, 2020 (2 pages).

Supplemental Chinese Search Report issued in corresponding Chinese Application No. 201510896122.8 dated Feb. 27, 2020 (1 page).

Japanese Search Report issued in corresponding Japanese Application No. 2018-524479 dated Oct. 21, 2020 (19 pages).

Japanese Office Action issued in Japanese Application No. 2018-524479 dated Nov. 17, 2020, 8 pages.

Nishida, Keisuke "Urgent plan an immediate effect protocol buffer," Web + DB Press, vol. 46, first edition, pp. 57-66 (Sep. 25, 2008).

* cited by examiner

FIG. 5

ACCESS REQUEST CONVERSION METHOD AND APPARATUS

CROSS REFERENCE TO RELATED APPLICATION

The disclosure claims the benefits of priority to International application number PCT/CN2016/107408, filed Nov. 28, 2016, and Chinese application number 201510896122.8, filed Dec. 8, 2015, both of which are incorporated herein by reference in their entireties.

BACKGROUND

A plurality of modules can be required in big data platform systems to achieve their respective functions. The modules can be designed and developed by different developers. The developers can design various types of modular interfaces to meet functional and performance requirements. For example, for Remote Procedure Call Protocols (RPC), custom binary protocols, and the like, the developers can perform development according to the interaction patterns of all protocols, resulting in a high degree of coupling among the modules.

Figure 1:
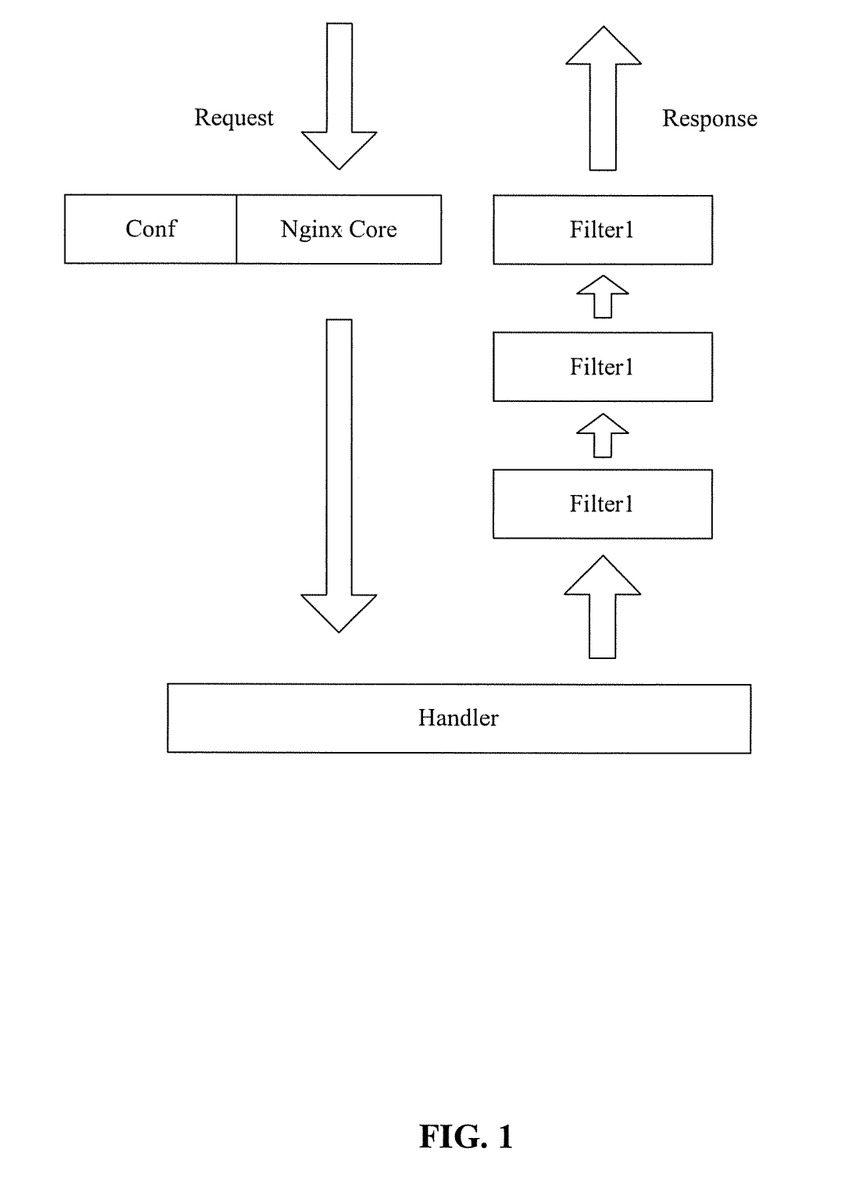
FIG. 1 illustrates a schematic structural diagram of an Nginx Lua system.

In order to reduce the degree of coupling among the modules, some intermediate protocol conversion apparatuses, such as Nginx modules and ServiceMix, can be used in big data platforms. In an Nginx module system as shown in FIG. 1, when a request is received, the received request can be mapped into a local data table by searching a configuration file. An instruction stored in the local data table can be triggered to instruct a handle module and a plurality of filter modules to complete their respective work, and a response can be returned. The handler module is responsible for processing the request and generating response content. The filter modules process the response content. Although a number of protocols can be supported in a ServiceMix system, protocol extension can also be performed as required.

However, in the Nginx module system and the ServiceMix system, the dependency between the systems is relatively high, and cluster management mechanism functions such as load balance and failover for the modules in the systems are relatively weak.

SUMMARY OF THE DISCLOSURE

Embodiments of the present invention provide an access request conversion method and apparatus.

An aspect of the present invention can be directed to an access request conversion method. The method can include: receiving an access request sent by a client, the access request including a uniform resource locator (URL) and parameter information; determining a target service type of the access request according to the URL and the parameter information; converting the access request according to the target service type; sending the converted access request to a server side corresponding to the target service type; and receiving result information returned by the server side according to the converted access request.

Another aspect of the present invention can be directed to an apparatus. The apparatus can include: a receiving module configured to receive an access request sent by the client, the access request including a uniform resource locator (URL) and parameter information; a determining module configured to determine a target service type of the access request according to the URL and the parameter information; a conversion module configured to convert the access request according to the target service type; and a sending module configured to send the converted access request to a server side corresponding to the target service type, wherein result information returned by the server side according to the converted access request is further received.

BRIEF DESCRIPTION OF THE DRAWINGS

In order to illustrate the technical solutions according to embodiments of the present invention more clearly, the accompanying drawings to be used in the embodiments of the present invention are introduced briefly below. It is appreciated that the accompanying drawings described below are only some embodiments of the present invention. Other drawings can be obtained according to the accompanying drawings without any creative efforts.

DETAILED DESCRIPTION

The technical solutions in the embodiments of the present invention are clearly and fully described below with reference to the accompanying drawings in embodiments of the present invention. It is apparent that the embodiments described are only a part rather than all of embodiments of the present invention. All other embodiments obtained by persons of ordinary skill in the art based on the embodiments of the present invention without any creative efforts shall fall within the protection scope of the present invention.

The access request conversion method and apparatus provided in embodiments of the present disclosure are applicable to a big data platform. An access request can use a protocol (e.g., http/https protocol) and be sent by the client side. By receiving the access request, the access request conversion apparatus can access a server side that supports a plurality of protocols such as an RPC and a custom binary protocol, to meet the client side's requirement for a target resource.

It is appreciated that, in embodiments of the present disclosure, the client side can include a program that corresponds to the server side and provides local services to customers. The client side can also be referred to as a Client or a user side. The client side can be installed on a common customer service machine. The client side can interact with another client side through different protocols, such as the socket protocol, the http/https protocol, and the RPC protocol. The access request can include a request message generated when the client side interacts with the server side in a protocol request-response pattern. The server side can include a server with a computer system providing services to other devices in a network. The server side can generate a response according to a received access request and perform processing. The server side has the ability to undertake access service and ensure the quality of the service. The server side may include a database server side, an application server side, a Web server side, and the like according to different service types.

Figure 2:
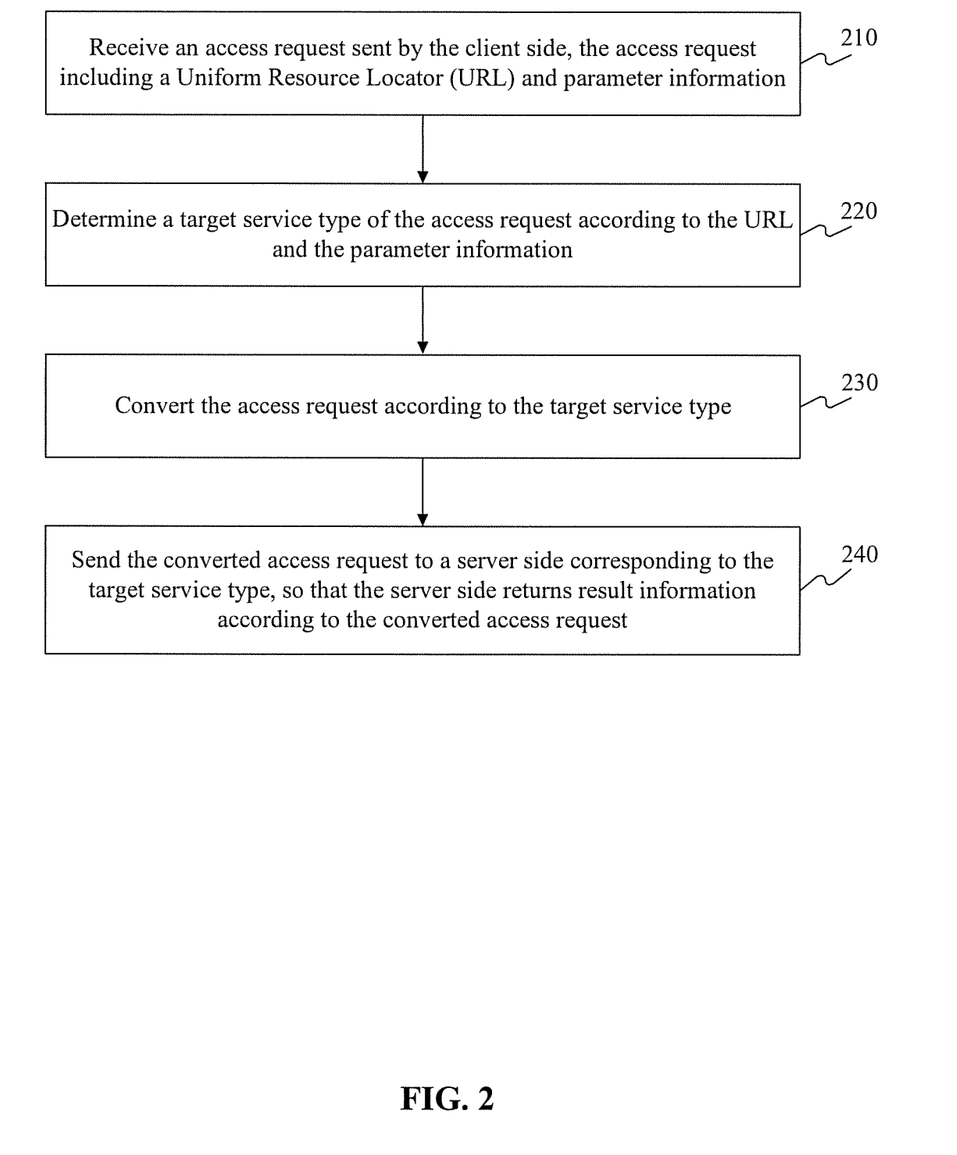
FIG. 2 is a flowchart of an access request conversion method according to embodiments of the present disclosure.

FIG. 2 is a flowchart of an access request conversion method according to embodiments of the present disclosure. The method may be performed by a device, a system, or an apparatus that has a processing capability. For example, the apparatus can be an intermediate protocol conversion apparatus. As shown in FIG. 2, the method can include steps 210-240.

In step 210, an access request sent by the client side can be received. The access request can include a Uniform Resource Locator (URL) and parameter information.

The access request can include a request message sent by the client side through a protocol. For example, the access request can be an http request. The request message may at least include a URL, parameter information, and a message body. The URL can indicate a location and an access method of a resource available on the Internet, and can be the address of a standard resource on the Internet. Each file on the Internet can have a unique URL. Information in the URL can include resource location information and the processing manner of the client side. The parameter information may include a parameter (e.g., "GET") for acquiring a resource identified by the URL, a parameter (e.g., "POST") for attaching new data after the resource identified by the URL, a response message header (e.g., "HEAD") for access request acquisition of the resource identified by the URL, a security-information-related authentication parameter of the access request, and the like.

In some embodiments, after the access request is received, the access request can be parsed, such that corresponding information including a URL, parameter information, a message body can be acquired from the access request.

After the corresponding information in the access request is acquired, the method may further include performing a predefined processing on the access request, the predefined processing including an authentication of the access request; and determining the target service type of the access request according to the URL and the parameter information when the authentication is successful.

Figure 3:
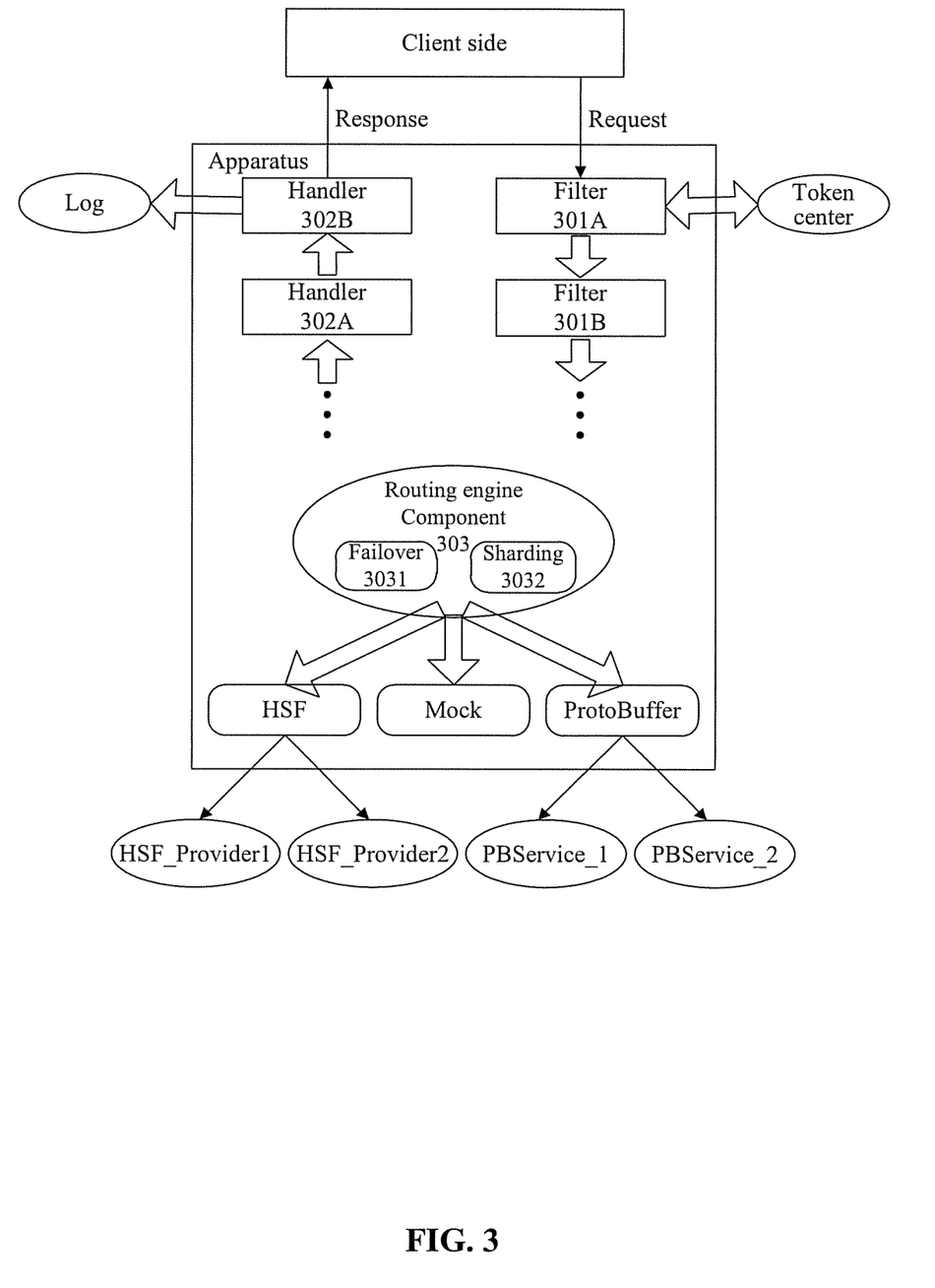
FIG. 3 illustrates a schematic structural diagram of an apparatus according to embodiments of the present disclosure.

In some embodiments, the predefined processing may include a predefined data modification and the authentication of the access request. For example, the predefined processing can be implemented by using a filter component that is registered in the apparatus and is custom-developed by a developer, as shown in FIG. 3.

In embodiments of the present disclosure, the authentication of the access request may include: matching authentication parameter information in the access request with token information of a token center. The authentication of the access request is successful when the authentication parameter information matches the token information.

For example, the filter component can send the access request to a token center, so that the token center performs calculations according to information in the access request to obtain token information and matches the token information with the authentication parameter information in the access request. When the token information matches the authentication parameter information, the authentication of the access request is successful, indicating that the access request passes the valid authentication. Otherwise, the access request fails to pass the authentication.

When the access request fails to pass the authentication, an information error can be returned to the client side to indicate to the user that the access request fails to pass the authentication. Thus acquisition of information by the client side can be facilitated. When the access request passes the authentication, step 220 can be performed.

In step 220, the target service type of the access request can be determined according to the URL and the parameter information.

In some embodiments of the present disclosure, the target service type can be a protocol type supported by the server side. For example, the protocol type can include a high-speed service framework (HSF), a Mock, and a Protobuffer. The protocol can also be extended to include other protocol types, to which no limitation is made in embodiments of the present disclosure.

In some embodiments of the present disclosure, determining the target service type of the access request according to the URL and the parameter information can further includes determining, according to the URL, whether a service corresponding to the URL path exists; and determining the target service type of the access request according to the parameter information when a service corresponding to the URL path exists.

In some embodiments, the apparatus can determine whether a service corresponding to the URL path exists by looking up a table. For example, Table 1 can be searched according to the URL path to determine whether a corresponding path exists in the table. For example, the URL path in the access request is path 1, and it is determined whether the path 1 exists by looking up the table. When the URL path in the access request exists in the table, it is determined that a service corresponding to the URL path exists. Otherwise, the service corresponding to the URL path does not exist.

TABLE 1

| URL | Target service type |
| --- | --- |
| Path 1 | HSF |
| Path 2 | Mock |
| Path 3 | Protobuffer |

It is appreciated that, Table 1 is merely intended to describe the technical solution of the present disclosure in detail. The content in Table 1 does not pose any limitation to the embodiments of the present disclosure, and no limitation is made to the content in the embodiment of the present disclosure.

When it is determined according to the URL that a service corresponding to the URL path exists, the target service type into which the access request is converted can be determined according to the parameter information. For example, the target service type can be determined by looking up a table. As shown in FIG. 1, based on path 1, which has been found to be present, the queried target service type is HSF. In some embodiments, the target service can be determined by a routing engine component 303, as shown in FIG. 3. The routing engine component may be a program that is developed by a developer and have a function of determining the target service type according to a URL and parameter information in an access request. Routing engine component 303 can include a sharding component 3031 and a failover component 3032. Sharding component 3031 can distribute the access request according to the determined target service type based on a failover strategy and a load balance strategy configured by the server sides (HSF_Provider1, HSF_Provider2, PBService_1 and PBService_2) of the access request, and send the access request to an engine component of the corresponding target service type, such as HSF, Mock and Protobuffer. The failover strategy can indicate that data or a file in the apparatus is damaged or lost, and the apparatus can automatically restore the damaged or lost file or data to a state before the accident occurred, to ensure the normal running of the apparatus. The load balance strategy can indicate distributing the access request to server sides, such as HSF_Provider1, HSF_Provider2, PBService_1, and PBService_2, corresponding to a plurality of engine components for processing, so that the task of processing the access request can be completed by the server sides together.

In embodiments of the present disclosure, failover component 3032 has the function of recording the configuration of a server side. Therefore, a routing engine can distribute the access request to an engine component of the corresponding target service type by querying the configuration of the server side in the failover component, so as to implement the load balancing. In other words, before the step of sending the access request converted according to the target service type to a server side corresponding to the target service type, the method can further include: querying, according to the target service type, the server side that corresponds to the target service type and is recorded in the failover component. Therefore, information of the access request can be distributed to the corresponding server side according to the target service type and according to the configuration of the server side, to implement load balancing.

In the embodiment of the present disclosure, during a process of determining, according to the URL, whether a service corresponding to the URL path exists or determining the target service type of the access request according to the parameter information, if a service corresponding to the URL path or the target service type does not exist, an information error can be returned to the client side to indicate reasons of the error, so that a user using the client side can be aware of the reasons.

In step 230, the access request can be converted according to the target service type.

In some embodiments, when receiving the access request, an engine component can convert the data structure of the received access request according to the target service type into a protocol type that can be supported by the server side. For example, as shown in FIG. 3, the access request can be converted by an engine component 303 into a protocol type (e.g., HSF, Mock or Protobuffer) that can be supported by e.g., HSF_Provider1, HSF_Provider2, a Mock server side, PBService_1, or PBService_2. Here, PBService is an abbreviation of Protobuffer Service.

In step 240, the access request converted according to the target service type can be sent to a server side corresponding to the target service type. Therefore, the server side can return result information according to the access request converted based on the target service type.

In some embodiments, when the engine component converts the access request into the access request of the corresponding target service type, the engine component can send the converted access request to a corresponding server side respectively. Therefore, the corresponding server side can generate a response according to the corresponding access request and return result information. The result information can include resource information for the access request of the client side, and may be text, an image, a video, or other information.

In some embodiments of the present disclosure, the method may further include: receiving the result information; processing the result information; and sending the processed result information to the client side, so that the client side performs a corresponding operation according to the processed result information.

In some embodiments, the engine component can receive the result information sent by the server side and send it to the routing engine component. Routing engine component 303 can convert the data structures of the received result information sent by different engine components into a unified data structure and return the unified data structure to a handler component 302 as described in FIG. 3. This component is a program that is developed by a developer and has the function of processing the returned result information into a data structure that can be received by the client side. For example, the component can perform compression, logging, data modification, and masking on the result information for the access request. By means of logging, it is possible to log information about the time from the moment when the access request is sent from the client side to the moment when the result information for the access request is returned to the client side. By means of masking, data transformation can be performed on sensitive information in the result information according to a masking rule, so that sensitive private data can be reliably protected. In embodiments of the present disclosure, a plurality of handler components can be set as required. In the process of processing the result information, the result information can be sequentially transmitted to a next handler component, so that data of the result information can be flexibly and transparently changed.

In embodiments of the present disclosure, an example of an access request is what is the result of "1+1", and the returned result is "2". The handler component can process the returned result of "2" according to a predefined processing manner. For example, the handler component can compress the returned result, so that the client side can perform corresponding processing according to the information after receiving the information. When the returned result is another value (for example, "3"), the handler component can send the returned value of "3" and additional result error information to the client side according to the predefined processing manner.

Based on the access request conversion method provided in embodiments of the present disclosure, the target service type of a received access request can be determined according to the access request, the access request can be parsed into a data structure corresponding to the target service type, and the data structure can be provided to a corresponding server side. Thus the function of a unified request interface for multiple networks in a big data platform environment can be achieved to decouple the dependency between systems and improve the systems' management mechanism function for modules.

It is appreciated that, in embodiments of the present disclosure, the filter component (including, e.g., 301A and 301B) and the handler component (including, e.g., 302A and 302B) in FIG. 3 can be loaded in as add-ons. A developer can develop data modification, authentication, statistics, compression, or other functions as required based on the access request (e.g., an HTTP request). A user can be registered in a link of the filter component and the handler component by providing basic information. When the apparatus is turned on, the system can dynamically load the components having predefined functions.

In embodiments of the present disclosure, the apparatus can convert the access request into a universal intermediate data structure. Therefore, communication protocols supported by different server sides can be joined. The universal data structure can be automatically converted into a fixed structure by using various developed engine components, and a developer can flexibly develop a system that supports specific protocols. Unlike the development of Nginx Lua, there is no need to implement a plurality of data structures in the filter component and the handler component in embodiments of the present disclosure, so the development cycle can be shortened. Likewise, there is no need for an in-depth understanding of the data structure of the system, as is necessary in the development of Nginx Lua, so development costs can be reduced.

It is appreciated that, in embodiments of the present disclosure, the client side may provide an access request using a protocol such as HTTP/HTTPS, socket, or RPC (such as HSF and Protobuffer). The server side can support protocols, such as HSF, Mock, and Protobuffer. The client side and the server side can further support other protocols, to which no limitation is made in embodiment of the present disclosure.

It is appreciated that embodiments of the present disclosure can be implemented in Java language.

Figure 4:
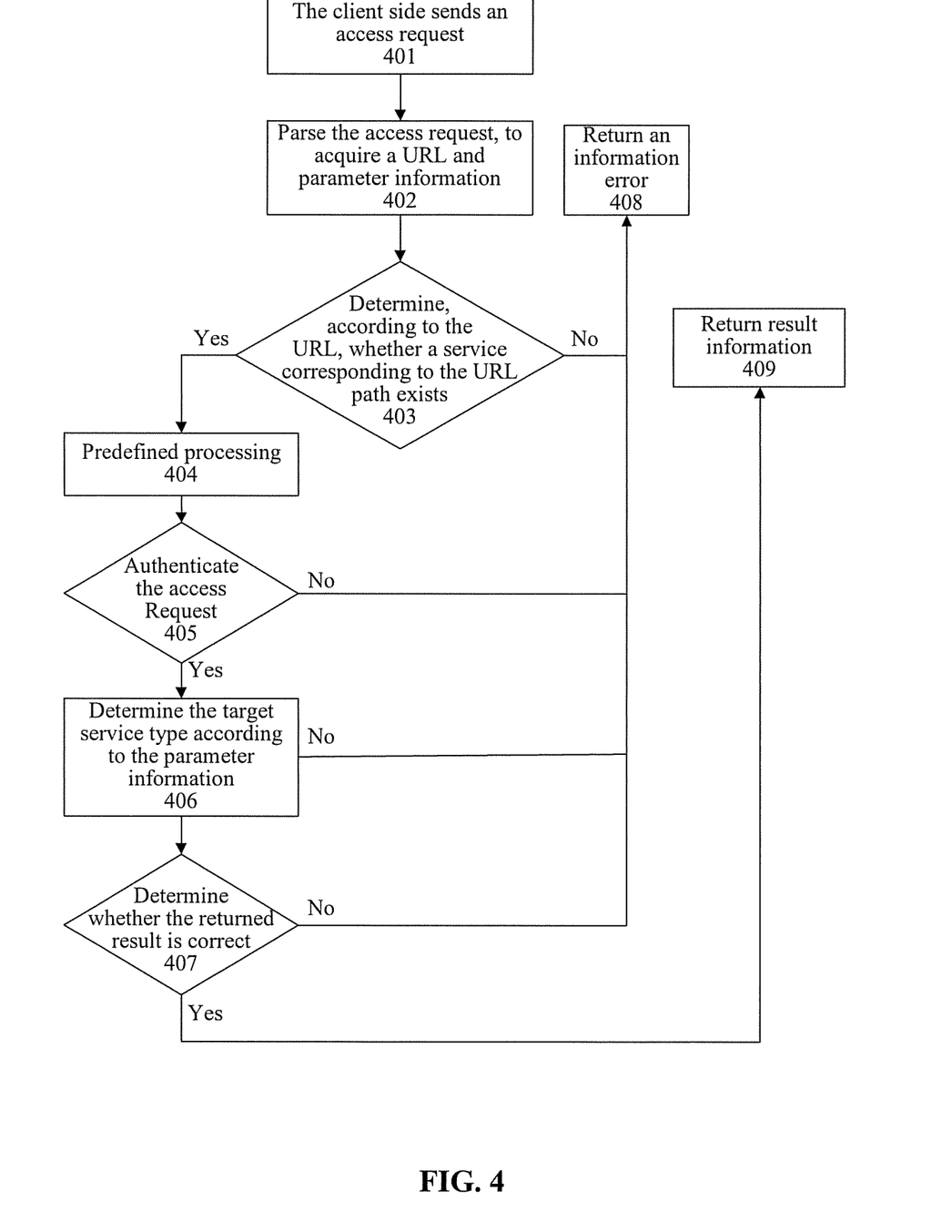
FIG. 4 is a flowchart of an access request conversion method according to embodiments of the present disclosure.

In some embodiments, in the method, determining (403), according to the URL, whether a service corresponding to the URL path exists can be performed after the apparatus acquires (402) corresponding information in the access request, as shown in FIG. 4. Therefore, the client side can acquire resource information required by the access request more rapidly.

When it is determined that a service corresponding to the URL path exists, pre-processing and authentication can be performed on the access request. And when the authentication of the access request is successful, the apparatus can determine the target service type of the access request according to the parameter information.

The specific step can be implemented through step 220 in FIG. 2, which is not further described here for simplicity.

It is appreciated that, in embodiments of the present disclosure, when the apparatus determines, according to the URL, whether a service corresponding to the URL path exists or determines the target service type of the access request according to the parameter information. If a service corresponding to the URL path or the target service type does not exist, an information error can be returned to the client side to indicate the reason for the error, so that a user using the client side can be aware of the reason for the error.

The access request conversion method according to the embodiments of the present disclosure has been described in detail above with reference to FIG. 2 to FIG. 4. The apparatus provided in embodiments of the present disclosure will be described in detail in the following with reference to FIG. 5.

Figure 5:
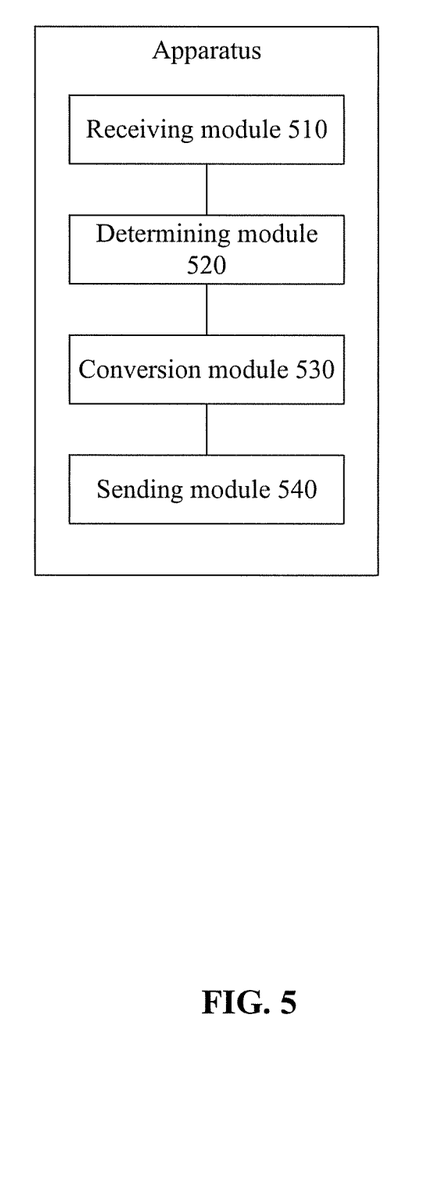
FIG. 5 illustrates a schematic structural diagram of an apparatus according to embodiments of the present disclosure.

FIG. 5 illustrates a schematic structural diagram of an apparatus according to embodiments of the present disclosure. As shown in FIG. 5, the apparatus can include a receiving module 510, a determining module 520, a conversion module 530, and a sending module 540.

Receiving module 510 can receive an access request sent by the client side. The access request can include a uniform resource locator (URL) and parameter information.

Determining module 520 can determine the target service type of the access request according to the URL and the parameter information.

Conversion module 530 can convert the access request according to the target service type.

Sending module 540 can send the access request converted according to the target service type to a server side corresponding to the target service type. Therefore, the server side returns result information according to the access request converted according to the target service type.

In some embodiments of the present disclosure, determining module 520 can further perform predefined processing on the access request. The predefined processing can include authentication of the access request. Determining module 520 can then determine the target service type of the access request according to the URL and the parameter information when the authentication is successful.

In some embodiments, determining module 520 can further match authentication parameter information in the access request with token information of a token center. The authentication of the access request is successful when the authentication parameter information matches the token information.

In some embodiments, determining module 520 can further determine, according to the URL, whether a service corresponding to the URL path exists, and determine the target service type of the access request according to the parameter information when a service corresponding to the URL path exists.

In some embodiments, determining module 520 can further determine, according to the URL, whether a service corresponding to the URL path exists, to determine the target service type of the access request according to the parameter information when the authentication of the access request is successful.

In some embodiments, receiving module 510 can receive the result information, and process the result information. Sending module 540 can further send the processed result information to the client side, so that the client side performs a corresponding operation according to the processed result information.

The processing of the result information can include at least one of data modification, compression, and masking.

In some embodiments, the apparatus can further include a query module configured to query, according to the target service type, the server side which corresponds to the target service type and is recorded in a failover component.

Based on the apparatus provided according to embodiments of the present disclosure, the target service type of a received access request can be determined according to the access request, the access request can be parsed into a data structure corresponding to the target service type, and the data structure can be provided to a corresponding server side. Thus the function of a unified request interface for multiple networks in a big data platform environment can be achieved, to decouple the dependency between systems and improve the systems' management mechanism function for modules.

It is appreciated that, in embodiments of the present disclosure, the foregoing and other operations and/or functions of the modules in the apparatus provided in FIG. 5 can be implemented by using the modules of the apparatus in FIG. 3, and corresponding processes of the methods in FIG. 2 and FIG. 4 can be implemented respectively, which are not further described here for simplicity.

It is appreciated that the units and algorithm steps in the examples described in combination with the embodiments disclosed herein may be implemented by electronic hardware, computer software, or a combination of computer software and electronic hardware. In order to clearly illustrate the interchangeability between hardware and software, the compositions and steps of the examples have been generally described in the above description according to functions. Whether the functions are performed in a hardware or software manner depends on the particular applications and design constraints of the technical solutions. For each specific application, those skilled in the art may implement the described functions by using different methods; however, such implementation shall not be construed as going beyond the scope of the present invention.

The steps of the method or algorithm described in combination with the embodiments disclosed herein can be implemented by using hardware, a processor-executed software module, or a combination of both. The software module can be disposed in a random access memory (RAM), a memory, a read only memory (ROM), an electrically programmable ROM, an electrically erasable programmable ROM, a register, a hard disk, a removable disk, a CD-ROM, or any other form of storage media well known in the technical field.

For example, embodiments of the disclosure provide a non-transitory computer readable medium that stores a set of instructions that is executable by at least one processor of a computing system to cause the computing system to perform a method for converting access requests. The method can include: receiving an access request sent by the client, the access request including a uniform resource locator (URL) and parameter information; determining a target service type of the access request according to the URL and the parameter information; converting the access request according to the target service type; sending the converted access request to a server corresponding to the target service type; and receiving result information returned by the server according to the converted access request.

In the set of instructions of the non-transitory computer readable medium, determining the target service type of the access request according to the URL and the parameter information can further include: performing authentication on the access request; and determining the target service type of the access request according to the URL and the parameter information when the authentication is successful.

The authentication on the access request can include: matching authentication parameter information in the access request with token information of a token center, wherein the authentication on the access request is successful in response the authentication parameter information matching the token information.

In the set of instructions of the non-transitory computer readable medium, determining the target service type of the access request according to the URL and the parameter information can further include: determining, according to the URL, whether a service corresponding to the URL path exists; and determining the target service type of the access request according to the parameter information in response to the service corresponding to the URL path existing.

Before performing the authentication on the access request, the method can further include: determining, according to the URL, whether a service corresponding to the URL path exists; and determining the target service type of the access request according to the parameter information in response to the authentication of the access request being successful.

The set of instructions of the non-transitory computer readable medium can further include: processing the result information; and sending the processed result information to the client for performing an operation according to the processed result information. The processing comprises any one or more of data modification, compression, and masking.

Before sending the converted access request to the server corresponding to the target service type, the method can further include: determining the server based on the target service type, wherein the server is recorded in a failover component.

The specific implementation manners described above further describe the objectives, the technical solutions, and the beneficial effects of the present invention in detail. It should be understood that the above description is merely specific implementation manners of the present invention and is not intended to limit the protective scope of the present invention. Any modification, equivalent replacement, improvement, and the like made within the spirit and the principle of the present invention shall fall within the protective scope of the present invention.

What is claimed is:

1. A method for converting access requests, the method performed by an apparatus communicatively coupled to a client and one or more servers and comprising:
receiving an access request sent by the client, the access request including a uniform resource locator (URL) and parameter information;
determining based on the URL whether a target service protocol type corresponding to the URL is one of a plurality of target service protocol types that are supported by the one or more servers;
determining the target service protocol type according to the URL and the parameter information includes:
performing authentication on the access request, comprising:
sending the access request to a token center;
obtaining token information from the access request by the token center;
matching authentication parameter information with the obtained token information; and
the authentication on the access request is successful in response to the authentication parameter information matching the token information;
determining the target service protocol type of the access request according to the URL and the parameter information when the authentication is successful;
converting the access request according to the target service protocol type, including:
converting the access request to a universal intermediate data structure; and
converting the universal intermediate data structure to the target service protocol type;
querying, according to the target service protocol type, a server configuration that corresponds to the target service protocol type and is recorded in a failover component; and
sending the converted access request to a server of the one or more servers corresponding to the target service protocol type according to the queried server configuration.

2. The method according to claim 1, further comprising:
receiving result information returned by the server according to the converted access request.

3. The method according to claim 2, further comprising:
processing the result information; and
sending the processed result information to the client for performing an operation according to the processed result information.

4. The method according to claim 3, wherein the processing of the result information comprises at least one of data modification, compression, and masking.

5. The method according to claim 1, wherein before sending the converted access request to the server corresponding to the target service protocol type, the method further comprises:
determining the server based on the target service protocol type, wherein the server is recorded in a failover component.

6. The method according to claim 1, further comprising:
recording the server configuration into the failover component; and
indicating, by the failover component, to distribute the access request to the one or more servers.

7. The method according to claim 1, wherein obtaining token information from the access request includes performing calculations on information in the access request.

8. An apparatus communicatively coupled to a client and one or more servers, comprising:
a memory storing a set of instructions; and
one or more processors configured to execute the set of instruction to cause the apparatus to perform:
receiving an access request sent by the client, the access request including a uniform resource locator (URL) and parameter information;
determining based on the URL whether a target service protocol type corresponding to the URL is one of a plurality of target service protocol types that are supported by the one or more servers;
determining the target service protocol type according to the URL and the parameter information includes:
performing authentication on the access request, comprising:
sending the access request to a token center;
obtaining token information from the access request by the token center;
matching authentication parameter information with the obtained token information; and
the authentication on the access request is successful in response to the authentication parameter information matching the token information;
determining the target service protocol type of the access request according to the URL and the parameter information when the authentication is successful;
converting the access request according to the target service protocol type, including:
converting the access request to a universal intermediate data structure; and
converting the universal intermediate data structure to the target service protocol type;
querying, according to the target service protocol type, a server configuration that corresponds to the target service protocol type and is recorded in a failover component; and
sending the converted access request to a server of the one or more servers corresponding to the target service type according to the queried server configuration.

9. The apparatus according to claim 8, wherein result information returned by the server according to the converted access request is further received.

10. The apparatus according to claim 9, wherein the one or more processors are configured to execute the set of instructions to cause the apparatus to further perform:
processing the result information; and
sending the processed result information to the client for performing an operation according to the processed result information.

11. The apparatus according to claim 10, wherein the processing of the result information comprises at least one of data modification, compression, and masking.

12. The apparatus according to claim 8, wherein before sending the converted access request to the server corresponding to the target service protocol type, the one or more processors are configured to execute the set of instructions to cause the apparatus to further perform:
determining the server based on the target service protocol type, wherein the server is recorded in a failover component.

13. A non-transitory computer readable medium that stores a set of instructions that is executable by at least one processor of an apparatus to cause the apparatus to perform an access request conversion method, wherein the apparatus is communicatively coupled to a client and one or more servers, the method comprising:
receiving an access request sent by the client, the access request including a uniform resource locator (URL) and parameter information;
determining based on the URL whether a target service protocol type corresponding to the URL is one of a plurality of target service protocol types that are supported by the one or more servers;
determining the target service protocol type according to the URL and the parameter information includes:
performing authentication on the access request, comprising:
sending the access request to a token center;
obtaining token information from the access request by the token center;
matching authentication parameter information with the obtained token information; and
the authentication on the access request is successful in response to the authentication parameter information matching the token information;
determining the target service protocol type of the access request according to the URL and the parameter information when the authentication is successful;
converting the access request according to the target service protocol type, including:
converting the access request to a universal intermediate data structure; and
converting the universal intermediate data structure to the target service protocol type;
querying, according to the target service protocol type, a server configuration that corresponds to the target service protocol type and is recorded in a failover component;
sending the converted access request to a server of the one or more servers corresponding to the target service protocol type according to the queried server configuration.

* * * * *